Aug. 20, 1957      F. VILBIG      2,803,800
FAST WORKING FREQUENCY ANALYZER
Filed Jan. 5, 1954      4 Sheets-Sheet 2
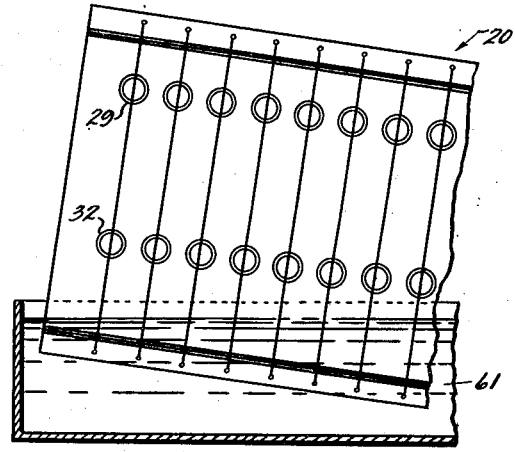
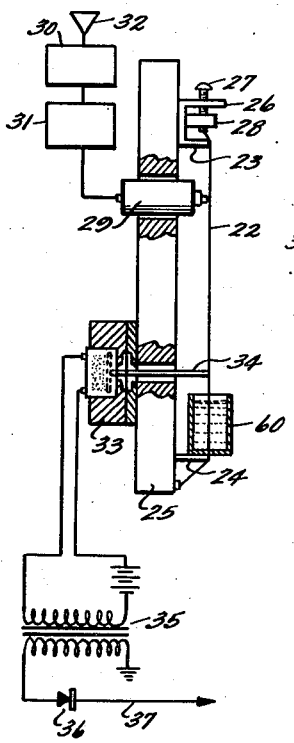
INVENTOR.
FRIEDRICH VILBIG

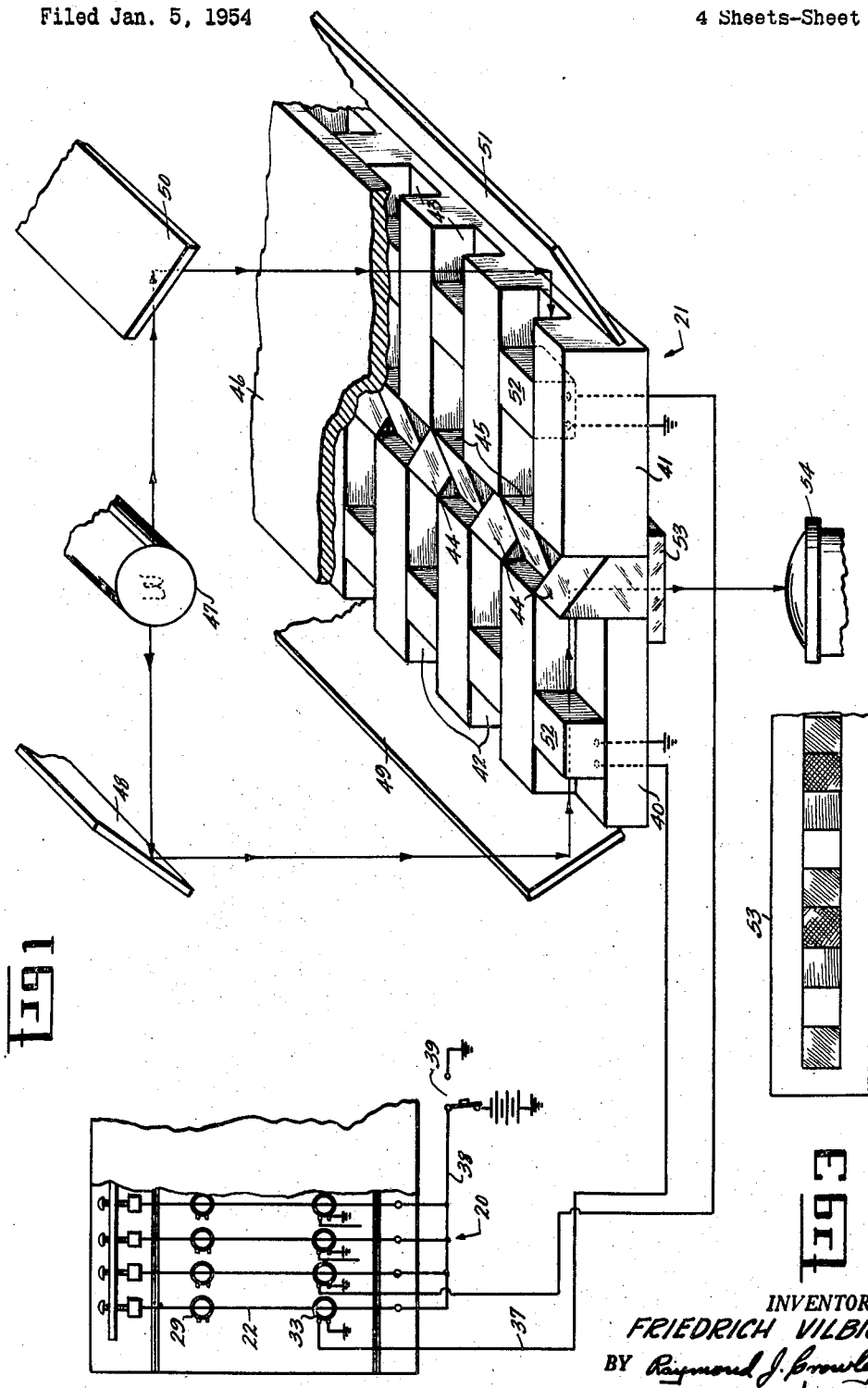

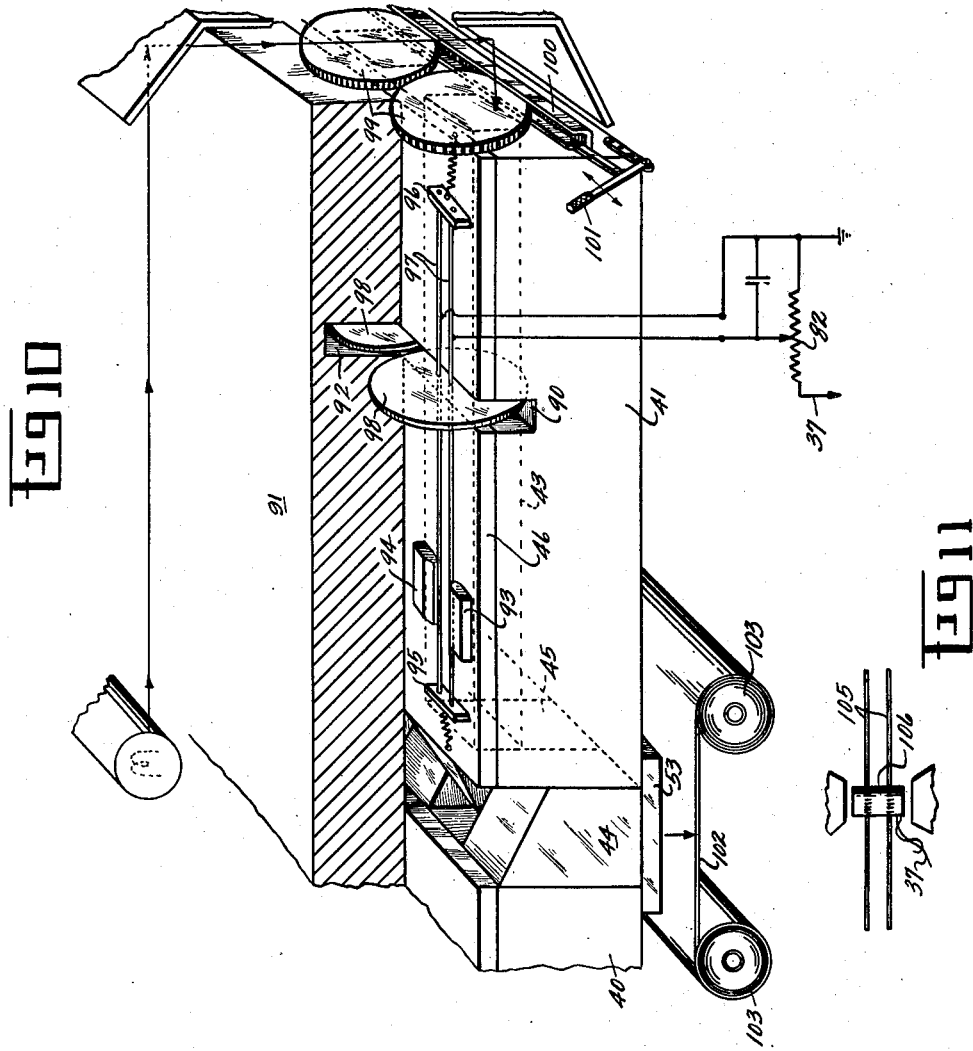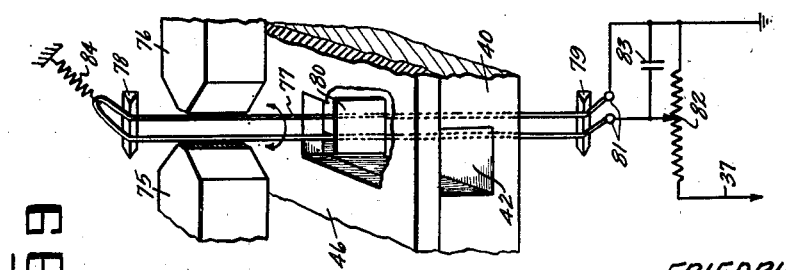

Aug. 20, 1957 F. VILBIG 2,803,800
FAST WORKING FREQUENCY ANALYZER
Filed Jan. 5, 1954 4 Sheets-Sheet 4
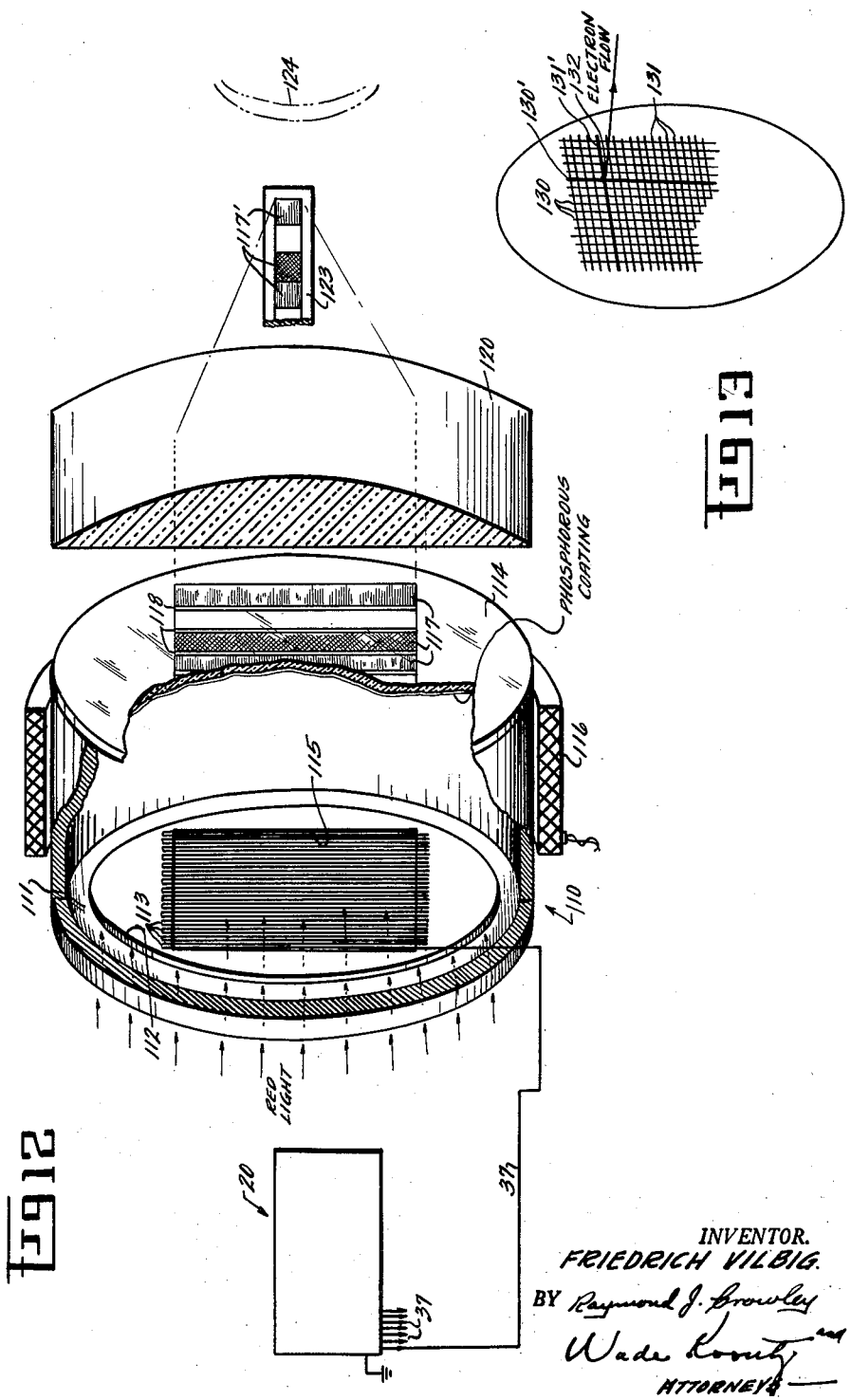
INVENTOR.
FRIEDRICH VILBIG.

United States Patent Office 2,803,800
Patented Aug. 20, 1957

2,803,800

FAST WORKING FREQUENCY ANALYZER

Friedrich Vilbig, Cambridge, Mass., assignor to the United States of America as represented by the Secretary of the Air Force Application January 5, 1954, Serial No. 402,418

21 Claims. (Cl. 324—77)

(Granted under Title 35, U. S. Code (1952), sec. 266)

This invention may be manufactured and used by or for the Government for governmental purposes without the payment to me of any royalty thereon.

This invention relates to frequency analyzers and more particularly to a fast working, electro-mechanical type having a multi-channel filter unit and a multi-channel light control unit operatively associated to provide visual results of the sound analyzed which may be recorded.

In frequency analysis of phenomena varying with respect to time, such as cardiac movements, voice oscillations, etc., there is a need for immediate visual representations and for records of the frequencies analyzed. Since the relationship among three variables—time, frequency, and amplitude—is to be plotted, such visual representations or recordings would have to be effected by registering the frequencies as functions of time and indicating the amplitude by the intensity or degree of shading of the frequency representations. Known methods exist wherein such analysis is accomplished by subdividing the frequency band to be analyzed into individual adjacent frequency ranges by means of filters. If a frequency lies in one of these ranges, this is indicated by a signal light, the light intensity being proportional to the amplitude of the frequency in the particular filter. The light intensities are then recorded on a moving phosphorus tape or film. The disadvantage of this method is that only a comparatively coarse subdivision of the frequency band to be analyzed is possible since otherwise the requirements in terms of filters and amplifiers for each frequency channel, etc., would be excessive.

In the present invention a plurality of string filters are illustrated as the preferred form of filter used in the invention, although reed filters, magnetostriction filters, or other filter of the mechanical resonant type may be used, having adjacent frequency range to provide a frequency band of about 3000 cycles per second. The filters are subjected to the mixed frequencies to be analyzed by excitation coils and the frequency vibrations from each responsive filter is picked up by a microphone which transforms the mechanical vibrations of the filter into electrical potentials. The electrical potentials are utilized to control light channels representative of the respective frequency channels which light channels present a visual indication of all the frequencies of the mixed frequencies analyzed with respect to time and in intensity representative of amplitude. The visual indication can be photographed or directed to a phosphorus tape as desired. The light channels may be produced by an incandescent system or by cathode ray tube means. The string or other filters may be damped by oil, wool, or the like, to provide a constant bandwidth. It is therefore a general object of this invention to provide a fast acting frequency analyzer by converting mixed frequencies to be analyzed into electrical pulses to which a bank of filter channels is subjected separating into component frequency bands by responsive filter mechanical vibrations the mixed frequencies and transforming the filtered mechanical vibrations into electrical potentials operative to control light channels corresponding to the filter channels and optically representing the light channels by light streaks on a visual surface from which a record may be made, each light streak representing a frequency band in the mixed frequencies with the intensity thereof indicating the amplitude of that frequency band.

Other objects, advantages, uses, and features will become more apparent as the description proceeds when considered with the accompanying drawings, in which:

Fig. 1 is an illustration, partly isometric and partly in elevation, with parts shown in section and cut away, of the frequency analyzer;

Fig. 2 is a diagrammativ view of a string filter illustrated as the preferred form of filter in this invention;

Fig. 3 is a partial front view of the visual screen on the light channeling device of Fig. 2;

Fig. 4 is an illustration of damping a bank of string filters;

Figs. 5 and 6 show wave forms of proportional damping and equally damped string filters, respectively;

Fig. 7 is an illustration of a reed type filter;

Fig. 8 is an illustration of a magnetostriction type filter;

Fig. 9 illustrates one form of controlling light passages;

Fig. 10 illustrates a modified form of controlling light passage in isometric view with parts shown in section;

Fig. 11 shows a modification of the torque producing means used in Figs. 9 and 10;

Fig. 12 illustrates a special tube in combination with the bank of string filters;

Fig. 13 illustrates a modified form of grid control in the special tube; and

Fig. 14 illustrates another form of special tube satisfactory for use in this invention.

Referring more particularly to Figs. 1, 2, and 3, there is shown in Fig. 1 a string filter bank 20 and a light channeling element 21. The string filter bank 20 includes a plurality of stretched steel strings 22 which are each tuned to a different frequency, as being preferable to make the lowest frequency at one end and progressively become higher toward the other end. The constructional details of each string filter are more particularly shown in Fig. 2 in which the steel string 22 is stretched over string bridges 23 and 24 fixed to a base member 25. The upper bridge 23 has an extension 26 thereon through which an adjusting screw 27 is threaded to position a slide 28 to which the upper end of the string 22 is attached for adjusting the tension of the string 22 to a certain desired frequency. The string is set into vibration by an electromagnet coil 29 which is coupled through an amplifier 30 and a pre-filter 31 from a microphone 32 or other input device. The coupling to each pre-filter and coil of the filter bank is made from the common amplifier 30. When the frequency imposed by the electromagnet 29 matches the frequency of the string 22, the string 22 will vibrate. These vibrations will be picked up by a microphone 33 through a light pin 34 positioned between the string 22 and the diaphragm of the microphone 33. The output of the microphone 33 is made through a transformer 35 and a rectifier 36 to leads 37. It is understood that each string of the filter bank has a direct current voltage applied thereto as illustrated at 38. A switch 39 is in this circuit to switch the filters to ground for the purpose later to be described.

Referring back to Fig. 1, the light channeling device is made primarily of blocks 40 and 41 having channels 42 and 43, respectively, cut therein in parallel relation across each block. The blocks 40 and 41 are positioned so that the channels 42 and 43 alternate, or are misaligned. At the inner end of the channels 42 are glass or Plexiglas prisms 44 to direct light coming through the channels 42 downwardly, and at the inner end of the channels 43 are glass or Plexiglas prisms 45 arranged to direct the light passing through channels 43 downwardly. The blocks 40 and 41 have a cover 46 whereby light passing through the channels 42 and 43 can only enter through the outer ends. Light is directed through all the channels 42 and 43 from a single elongated light tube 47, such as a soffit lamp, the light to the light channels 42 coming by reflection from mirrors 48 and 49 and the light to the light channels 43 coming by reflection from mirrors 50 and 51 as shown by the arrows in Fig. 1. Each light channel 42 and each light channel 43 is modulated by a light modulator means 52 merely represented in Fig. 1 as an element in each passage but the constructional details of which will be presently described. The output 37 from one each of the microphones 33 is connected to one each of the light modulators 52, the lowest frequency to the first light channel 42, the second frequency to the next adjacent light channel 43, and the next higher frequency to the next adjacent light channel 42, etc. All light channels being directed downwardly through the prisms 44 and 45 are imaged on a frosted or ground glass plate 53 where they may be viewed, photographed as shown by the camera 54, or exposed to a phosphorous tape. Fig. 3 shows a face view of the frosted or ground glass plate 53 with light patterns illustrated thereon as the component frequency bands. The responsive string filters will modulate the corresponding light channels accordingly.

Referring to Figs. 2, 4, 5, and 6, the strings 22 of the string filters must be damped to provide a constant band width of the resonance curves. In Fig. 2 damping is illustrated by having the lower end of each string immersed in a cup of oil as shown by 60 and in Fig. 4 the lower ends of all the strings in the string filter bank 20 are immersed in a tank of oil 61 with the degree of immersion decreasing with the higher frequency filters. Fig. 5 represents the resonance curves of uniform bandwidth where immersion in oil decreases with the higher frequencies and Fig. 6 illustrates the increase in bandwidth where the string immersion is of uniform depth. Other known means of damping, as by using wool, and the like, may be used.

Fig. 7 shows a reed filter which may be used, where desired, in place of the string filter. Here a reed 65 tuned to the desired frequency is fixed at one end in the frame 66 and set into vibration by the electromagnetic coil 29 in the same manner as the string of Fig. 2. The microphone 33 picks up the vibrations and transmits them in the same manner as the microphone in Fig. 2. A bank of reed filters may be made and damped in like manner as the bank of string filters.

Fig. 8 illustrates a magnetostriction filter wherein a metal rod 70 of desired frequency characteristics is centrally supported and the energy from the mixed frequency source applied to the coil 71. The responsive frequency vibrations will be picked up by the microphone 33 as before. These filters may also be used in bank in the same manner as the bank of string filters as illustrated in Fig. 1.

It has been found that each frequency channel should have a bandwidth of about 50 cycles per second. Therefore, where it is desirable to cover a frequency band of about 3000 cycles per second, 60 filters and 60 light channels would be necessary. With the filters arranged in bank and the light channels arranged as shown, 60 frequency tracks can be provided for in a relatively small and compact unit.

Referring now to Fig. 9 illustrating one form of light modulator as shown in general by reference character 52 in Fig. 1, there is shown a partial sectional view of a single light channel, for example 42 of Fig. 1, in the block 40. On the cover 46 is mounted a magnet having the pole ends 75 and 76 directly over the light channel 42. A bifilar oscillograph loop 77 is stretched to lie between the pole ends 75 and 76 and through openings (not shown) transversely of the light channel 42, opposite ends thereof lying on knife edged blocks 78 and 79 to support the loop in the proper position in a plane through the pole ends. Suspended on the loop 77 within the light channel 42 is a flap 80 which, in the neutral position, blocks the channel to light passage thereby providing a negative image on the plate 53. The leads 37 from the corresponding microphone 33 are connected to the loop 77 at 81 through a potentiometer 82 for adjusting the sensitivity of the flap 80. The sensitivity of a microphone decreases at higher frequencies. The potentiometers 82 are therefore necessary to compensate, by adjustment, the microphone output voltages at the higher frequencies. A condenser 83 short circuits the alternating current components superimposed on the direct current to prevent loop vibration. When a rectified current flows through the leads 37 from the microphone 33 and consequently through the loop 77, the loop 77 rotates as a result of the magnetomotive force on the loop 77 from the pole ends 75, 76 to cause the flap 80 to open the light channel to an extent dependent on the magnitude of the rectified current. The loop 77 being under tension by a spring 84 stabilizes it and also restores the flap to the normal closed position in the absence of current flow therein. With such a flap control used to modulate the light in each light channel the immediate results will be visible on the ground glass plate 53 of the filters responding to the frequency bands excited by the mixed frequency input. The positive channel patterns on the frosted or ground glass plate 53 each indicate a component frequency band of the complete frequency spectrum in accordance with that frequency received in with the mixed frequency signals from the microphone 32, or other mixed frequency transmitting device. The intensity of the positive patterns indicate the amplitude of the mixed frequencies transmitted through the microphone or other device 32. The intensity of a positive light pattern on the frosted or ground glass plate 53 from a certain light channel is determined by the intensity of the vibration of the string 22 in the corresponding string filter and consequently of that component frequency band of the mixed frequencies having a corresponding amplitude.

Another means of modulating the light through each light channel is shown in Fig. 10 wherein the block, for example 41, and the cover 46 have a groove 90 cutting transversely off all of the light channels 43. A second cover 91 used in this modification has a coextending groove 92 matching the groove 90. Over each light channel 43 and fastened to the top-side of the cover 46 is a magnet having the pole ends 93 and 94 centered over the light passage in similar manner as the pole ends 75, 76 in Fig. 9. Stretched between two spring biased end plates 95 and 96 is a bifilar oscillograph loop 97 in a plane through the pole ends 93, 94 and parallel to the light passage 43. The leads 37 from the respective microphone 33 is connected to the loop 97 in like manner as in Fig. 9. The loop 97 passes substantially centrally through a Polaroid disk 98 which is supported by the loop 97 in the grooves 90, 92. Energization of the loop 97 causes the loop to rotate, as explained for Fig. 9, to rotate the Polaroid disk 98. The Polaroid disc 98 is of sufficiently large diameter to cover the light channel 43. At the light inlet end of the light channel 43 is a second Polaroid disc 99 which is positioned 90 degrees out of phase with the Polaroid disc 98 to block the passage of light through this channel in the neutral position. Any activity of the respective filter to produce a potential in the loop 97 will cause the Polaroid disc 98 to rotate to augment or diminish the passage of light in an amount dependent on the intensity of the potential. The Polaroid disc 99 and all the other fifty-nine similar Polaroid discs covering the light channel entrances may be coupled mechanically by a gear rack 100 cooperative with gear teeth on each Polaroid disc 99 and controlled by a lever 101 to rotate these discs, where desirable, permitting rapid changeover from positive to negative patterns, and vice versa. The active light channels 42 and 43 will then register their light patterns on the frosted or ground glass plate 53 which may be recorded for a short time interval on a phosphorous tape or belt 102 passing over, and driven by, rollers or spools 103. As may be well understood, either a photographic record as shown in Fig. 1 or a visual record may be made as shown in Fig. 10.

As shown in Fig. 11, instead of using an energized loop as shown at 77 in Fig. 9 and at 97 in Fig. 10, the flap or Polaroid disk may be suspended on steel strands 105 which support a coil 106 the leads of which are coupled to leads 37 of the respective microphone 33. The coil 106 is electrically insulated from the strands 105.

It is believed that from the foregoing description the operation of the frequency analyzer is apparent but a brief statement of operation will be given to avoid misunderstanding. The mixed frequencies to be analyzed are introduced at the microphone 32, or other input device, which are amplified, pre-filtered for each band filter, and impressed on each of the electromagnets 29 positioned to excite the strings 22 of the bank of string filters 20. The frequency range of the input mixed frequencies will excite those filters tuned for frequency bands in that range, the greatest excitation coming to those filters which are more intense in the input. Each excited string filter produces a like frequency in the corresponding microphone 33 which is superimposed on the direct current component in the microphone circuit. The output voltages from the microphones 33 are each amplified and rectified and impressed on the respective bifilar oscillograph loop, or the coil 106 as the case may be, to cause a modulation of the light through the light channels 42 and 43 in correspondence with the intensity of the potentials produced by the corresponding microphones 33. The frosted or ground glass plate 53 will register which light channels are open and the intensity of the light patterns produced will indicate the amplitude of the input frequency at that band of the spectrum. Immediate analysis of the mixed frequency input is readily available on a photographic film, a phosphorous tape, or by viewing the frosted or ground glass plate 53.

The electro-mechanical means of controlling light channels may be accomplished by a special electronic tube as shown in Fig. 12. An electronic tube 110 has a cathode 111, an anode 112, a plurality of individual grid wires 113, and a fluorescent screen 114. The cathode may be a photo-cathode type which will emit electrons when subjected to red light or of the type that will emit electrons uniformly when uniformly heated. The anode 112 has a square opening 115 over which the grid wires 113 are stretched in vertical parallel relation. Each grid wire 113 may be a single strand but is preferably a single loop and the ends extend through the tube 110 in the well known manner. The first grid loop, for example the first on the left as seen in Fig. 12, is biased through the leads 37 from the first string filter of the string filter bank 20. The second grid loop 113 is connected to the second string filter, and so on until all sixty filter and light channels are coupled. A magnetic lens 116 is positioned over the special tube 110 to maintain the electron beams in sharp focus on the fluorescent screen 114, as is well known in the art. The grid loops 113 will block the passage of electrons at zero or negative potential but will permit electrons to pass when the grid potential becomes positive, the intensity of the electron flow being dependent on the grid potential whereby it follows that the luminous vertical streaks on the fluorescent screen 114, represented by the reference character 117, will be of a brightness depending on the amplitude of the frequency input to the string filter bank 20 for the corresponding frequency bands. The fluorescent streaks 117 shown on the right half of the fluorescent screen 114 are of the higher frequencies and are exaggerated in size for the purpose of illustration.

The arrangement of the special tube 110 just described allows shadow streaks 118 to appear on the fluorescent screen 114 between the fluorescent streaks 117 as a result of the shading action of the grid wires 113. This may be avoided by not focusing the images 117 so sharply on the fluorescent screen so that sufficient blurring occurs to bring the fluorescent streaks 117 in juxtaposed relation. Another suitable means to eliminate the shadow streaks 118 would be to set up a magnetic or electrostatic field across the special tube 110 with an alternating or wobble frequency which would wobble the fluorescent streaks 117 sufficiently to close out the shadow streaks 118.

If we make a photographical picture of the fluorescence screen picture we get an amplitude spectrum (amplitudes versus frequencies). But, if the frequency spectrum is fast changing, then many pictures must be taken like by motion pictures. But if we compress the streaks on the screen pictures by means of a cylindrical lens in front of the image screen and we image this on the glass plate 123, the long streaks are concentrated to the short streaks 117'. A camera 124 is illustrated as the means of recording the frequency analysis although a phosphorous tape, or other known means of recording may be used. It is to be understood that the special tube 110, the cylindrical lens 120, the ground glass plate 123, and the camera 124 are all to be properly encased for good visual results.

It is also contemplated that points of light may be made on the fluorescent screen 114 by changing the grid structure as shown in Fig. 13. Two sets of grid wires 130 and 131 may be positioned in a perpendicular relation with one each in one set 130 being paired with one each in the other set 131. When all grids have a negative bias thereon no electrons will flow but, as an example, if grid wires 130' and 131' have a positive potential impressed thereon there will be electron flow from the point 132 which will be imaged on the screen 114. All such spots can be brought to a line focus on the frosted or ground glass plate 123 as shown in Fig. 12. It is to be understood that each pair of grid wires 130 and 131 is connected to one each of the leads 37 from the string filter bank 20.

A simplified special tube to provide direct visual analysis without the use of a cylindrical lens or a ground glass plate is shown in Fig. 14. This special tube 140 has a base 141 over which is mounted a glass cover 142 with a fluorescent screen 143 on the top thereof. The special tube 140 is an elongated tube and has a long cathode 144 running lengthwise thereof. Spaced along and bending over the cathode 144 are grid wires 145 equal in number to the number of channels desired, in the illustration of the invention herein the number required would be sixty. The grids 145 with a negative bias thereon will block the flow of electrons from the cathode 144 to the fluorescent screen 143 but the grids 145 with a positive potential thereon will permit electron flow which will produce fluorescent streaks 146 on the screen 143, the intensity thereof determined by the potential of the grid. The grids 145, as may be understood, are separately coupled to the respective string filter leads 37 to provide a visual analysis of the mixed frequency input to the string filter bank 20. The short distance between the cathode 144 and the fluorescent screen 143 eliminates any necessity for a focusing coil and the fluorescent streaks 146 are sharply imaged in short streaks comparable to the images produced on the frosted or ground glass plates 53 and 123. The fluorescent screen 143 may be watched, or photographed, or directed toward a phosphorous tape for recording purposes as in the other modifications.

Although this invention has been illustrated with several embodiments to show the advantages of the invention and how it may be carried out, it is to be understood that many modifications and changes may be made

I claim:

1. A fast working frequency analyzer for giving immediate analysis of mixed frequencies comprising filter means for filtering the mixed frequencies into separate component frequency bands, each of said filter means including a pre-filter and a filter, a microphone for each of said filters, said microphone having the diaphragm thereof mechanically vibrated by the filter to provide an electrical output proportional to the amplitude of the associated frequency band, means for amplifying and rectifying the output of each of said microphones, means providing a plurality of light channels, means for directing light into said channels, light modulating means associated with each of said channels, each light modulating means being controlled by the output of one each of said filters to control the corresponding light channel in light intensity in direct relation with the amplitude of the frequency in the corresponding frequency band and visual means indicating the passage and intensity of light through each of said channels.

2. A fast working frequency analyzer for giving immediate visual analysis of a mixture of frequencies comprising, electro-mechanical filter means having electrical exciters of mechanical responsive elements and microphone outputs coupled to said mechanical responsive elements to filter a mixture of frequencies impressed on said electrical exciters into separate frequency bands with the output currents of each microphone corresponding to the amplitude of the related exciting frequency, and light channeling means having visual means indicating open and closed light channels with electrically responsive light modulating means in each light channel connected to one each of said microphones for controlling the respective light channel in intensity in accordance with the corresponding exciting frequency whereby immediate visual analysis is made of a mixture of frequencies.

3. A fast working frequency analyzer as set forth in claim 2 wherein said light channeling means is a block with a plurality of parallel openings therethrough exposed to a light source at one end and having a ground glass plate providing said visual means covering said other ends.

4. A fast working frequency analyzer as set forth in claim 3 wherein said light modulating means in each light channel is an electromotive means supporting a light controlling means in said light channel.

5. A fast working frequency analyzer as set forth in claim 4 wherein said light controlling means is a pair of Polaroid plates one of which is rotatively supported by said electromotive means.

6. A fast working frequency analyzer as set forth in claim 5 wherein the other of said Polaroid plates of all light channels are mechanically linked together to be rotated by a common control.

7. A fast working frequency analyzer as set forth in claim 2 wherein said electro-mechanical filter means are string filters.

8. A fast working frequency analyzer as set forth in claim 2 wherein said electro-mechanical filters are reed filters.

9. A fast working frequency analyzer as set forth in claim 2 wherein said electro-mechanical filters are magnetostriction filters.

10. A fast working frequency analyzer as set forth in claim 2 wherein said light channeling means is a special electronic tube having a cathode, a fluorescent screen with a condensing lens and a light scattering plate in the focus thereof providing said visual means, and grids providing said electrically responsive light modulating means.

11. A fast working frequency analyzer as set forth in claim 10 wherein said grids are a plurality of vertical grid wires between said cathode and said fluorescent screen to produce vertical parallel fluorescent streaks on said fluorescent screen which are reduced to light spots along said light scattering plate.

12. A fast working frequency analyzer as set forth in claim 2 wherein said light channeling means is a special electronic tube having a cathode, a fluorescent screen with a condensing lens and a light scattering plate in the focus of said lens providing said visual means, and crossed pairs of grid wires between said cathode and said fluorescent screen providing said electrically responsive light modulating means.

13. A fast working frequency analyzer as set forth in claim 2 wherein said light channeling means is a special elongated electronic tube with an elongated cathode therein and having a fluorescent screen extending in close relation over said cathode providing said visible means and a plurality of grid wires between said cathode and said fluorescent screen providing said light modulating means.

14. A fast working frequency analyzer for giving immediate visual analysis of a mixture of frequencies comprising; a bank of string filters having damping means thereon, each string filter having an exciting means rendered operable by a mixed frequency input and a microphone output having the diaphragm of said microphone mechanically connected to the string of said string filter to produce electrical potentials upon the activation of said string filter by a resonant frequency in a ratio corresponding to the amplitude of said resonant frequency; a light channeling device comprising of a pair of juxtapositioned blocks with parallel passages therethrough in each, the passages in each block being staggered with the passages in the other block and a prism over the end of each passage between the blocks to direct light passing through said passages to a light scattering plate under all said prisms, said passages each having an electromotively operated light controlling means therein with the electromotive operator of each passage being electrically coupled to one microphone output of one each predetermined string filter; and means to light each passage uniformly whereby a mixed frequency impressed on said exciting means of said bank of string filters will control the light passing through said block passages in the predetermined order which light from each block passage will be registered on said light scattering plate in light intensity corresponding to the amplitude of the frequency in said corresponding string filter.

15. A fast working frequency analyzer as set forth in claim 14 wherein the electromotively operated light controlling means is a bifilar oscillograph loop suspending a flap in each said light passage, a portion of said loop passing between the pole ends of a magnet.

16. A fast working frequency analyzer as set forth in claim 14 wherein the electromotively operated light controlling means is a bifilar oscillograph loop suspending a Polaroid disc across the light passage, a portion of said loop passing between the pole ends of a magnet, and a Polaroid disc supported across said passage whereby the loop supported Polaroid disc is rotatable with respect to said second-mentioned disc in accordance with the potential applied to said loop.

17. A fast-working frequency analyzer as set forth in claim 14 wherein said damping means is a container of oil in which the lower ends of all said string filters are immersed, said string filters of higher frequency being immersed less than those of lower frequency to produce a constant bandwidth of the resonance curves of said strings.

18. A fast working frequency analyzer for giving immediate visual analysis of a mixture of frequencies comprising; a bank of string filters having damping means thereon, said string filters having an exciting means rendered operable by mixed frequency input and a microphone output for each filter having the diaphragm thereof mechanically connected to the string of said string filter to produce electrical potentials upon the activation of said string filter by a resonant frequency in a ratio corresponding to the amplitude of said resonant frequency; an electronic tube having a cathode, grids, and a fluorescent screen, the grids each being coupled to one each of said microphone outputs of said string filters to produce fluorescent streaks on said fluorescent screen in accordance with the activated string filters and with a light intensity in accordance with the amplitude of said resonant frequency; and a means for concentrating said luminous streaks to spots of light comprising a cylindrical lens positioned in front of said fluorescent screen with the axis of curvature thereof slightly tilted from an axis normal to said fluorescent streaks to prevent grid shadowing and a ground glass plate in the focus of said cylindrical lens for imaging said fluorescent streaks in an uninterrupted light spot pattern corresponding to the filtered mixed frequencies.

19. An indicating frequency analyzer comprising a light transmitting channel, a source of light, means operative to project a beam of light from said source into said channel, a screen mounted to be illuminated by light passing through said channel, a light barrier mounted in said channel, means operative to receive a sound wave, means operative to separate a predetermined frequency band component from said sound wave, a tuned vibratory member, magnetic means operative to energize said vibratory member proportional to the amplitude of said frequency band, a generator operative to produce a unidirectional current potential proportional to the vibration of said vibratory element, motor means operative to open said barrier an amount proportional to the amplitude of said direct current potential.

20. An indicating frequency analyzer comprising a light transmitting channel, a source of light, means operative to project a beam of light from said source into said channel, a screen mounted to be illuminated by light passing through said channel, a conducting loop extending across said channel, a flap mounted on said loop and constituting a light modulator in said channel, means operative to convert a sound wave into an electrical wave, means operative to separate a predetermined frequency band component from said electrical wave, a tuned vibratory member, magnetic means operative to energize said vibratory member proportional to the amplitude of said frequency band, a unidirectional current generator operative to produce a potential proportional to the vibration of said vibratory element, means operative to produce a magnetic field about a portion of said loop, and connections impressing the output of said unidirectional current generator on said loop.

21. An indicating frequency analyzer comprising a light transmitting channel, a source of light, means operative to project a beam of light from said source into said channel, a screen mounted to be illuminated by light passing through said channel, a conducting loop extending across said channel, a flap mounted on said loop and constituting a light modulator in said channel, means operative to produce a complex electrical wave, means operative to separate a predetermined frequency band component from said electrical wave, an electromagnet energized by said component, a stretched conducting element extending in the magnetic field of said electromagnet, a source of unidirectional current connected across said element, a unidirectional current generator including a diaphragm actuated by vibration of said element, means operative to produce a magnetic field about a portion of said loop, and connections impressing the output of said unidirectional current generator on said loop.

References Cited in the file of this patent
UNITED STATES PATENTS

| | | |
|---|---|---|
| 2,197,466 | Eggert | Apr. 16, 1940 |
| 2,246,001 | Powers | June 17, 1941 |
| 2,410,115 | Varian | Oct. 29, 1946 |
| 2,492,062 | Potter | Dec. 20, 1949 |
| 2,500,431 | Potter | Mar. 14, 1950 |
| 2,594,740 | De Forest | Apr. 29, 1952 |
| 2,641,640 | Hisserich | June 9, 1953 |
| 2,643,286 | Hurvitz | June 23, 1953 |
| 2,648,822 | Walter | Aug. 11, 1953 |